No. 869,349. PATENTED OCT. 29, 1907.
J. H. COULT.
GRASS CATCHER.
APPLICATION FILED MAY 7, 1906.
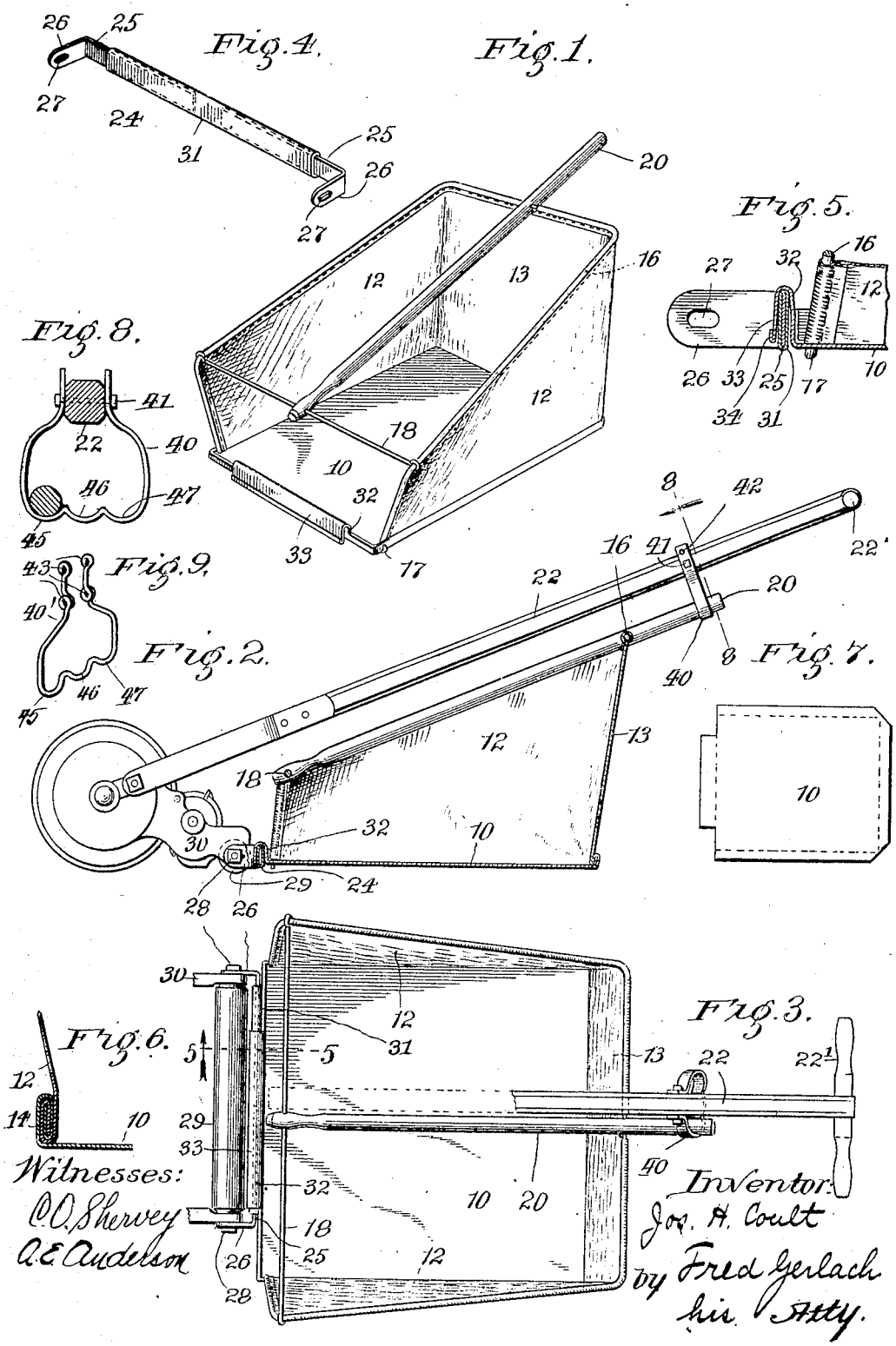

UNITED STATES PATENT OFFICE.

JOSEPH H. COULT, OF FAIRMONT, MINNESOTA, ASSIGNOR TO HOUGHTALING-COULT MANUFACTURING COMPANY, OF FAIRMONT, MINNESOTA, A CORPORATION OF MINNESOTA.

GRASS-CATCHER.

No. 869,349.　　　Specification of Letters Patent.　　　Patented Oct. 29, 1907.

Application filed May 7, 1906. Serial No. 315,553.

*To all whom it may concern:*

Be it known that I, JOSEPH H. COULT, a resident of Fairmont, in the county of Martin and State of Minnesota, have invented certain new and useful Improvements in Grass-Catchers, of which the following is a full, clear, and exact description.

The invention relates to grass catcher for lawn mowers. One object of the invention is to provide an improved grass catcher which may be adjusted laterally with respect to a lawn-mower to catch grass from the mower which is thrown laterally and rearwardly by the action of the cutters of the mower or in like direction by the wind.

In practice it has been found difficult to catch all the grass cut by a mower because of the difference in direction of the grass which is frequently blown laterally by the wind. It has also been found that the direction in which the grass is thrown by the cutters of the mower varies materially because of difference in construction and arrangement of the cutters. The invention provides a receptacle or catcher which can be readily and conveniently adjusted laterally to catch the grass despite variation of the direction of the discharge of the grass or deflection of the grass by the wind in either direction laterally, and this advantageous feature makes it possible to catch substantially all of the grass and avoids the necessity of raking a lawn after the grass has been cut.

Another object of the invention is to provide an improved construction for a grass-catcher which can be readily attached and detached from the mower so the contents can be conveniently discharged from the catcher.

The invention further designs to provide a grass-receptacle of improved construction.

The invention consists in the several novel features hereinafter set forth and more particularly defined by claim at the conclusion hereof.

In the drawings: Figure 1 is a perspective of the improved grass-catcher. Fig. 2 is a view showing the improved catcher applied to a lawn mower of usual construction, the catcher being shown in section and the mower being shown in elevation. Fig. 3 is a plan view of the catcher and a portion of the handle of the mower.
Fig. 4 is a perspective of the adjustable bail which is adapted to be secured to the mower and whereby the front end of the catcher is detachably connected thereto. Fig. 5 is an enlarged section taken on line 5—5 of Fig. 3. Fig. 6 is a detail section illustrating the manner of uniting the metallic bottom and the fabric sides of the receptacle. Fig. 7 is a plan of a blank from which the receptacle bottom is formed. Fig. 8 is a detail section on line 8—8 of Fig. 2, showing in detail the hanger for adjustably supporting the handle of the grass catcher. Fig. 9 is a perspective of a similar support made of bent wire.

The receptacle for catching the grass from the mower comprises a bottom 10 of sheet-metal, and sides 12 and a back 13 made of a suitable fabric, such as stout duck-cloth or canvas. The lower edge of the sides and back are secured to the metallic bottom by interfolding the overlapping edges of the metal and the fabric respectively, the interfolded portions extending vertically as shown at 14 in Fig. 6. Preferably the seam or joint is made by a double fold of the metal and fabric. The overlapping edges are rolled or pinched together so the fabric will be securely united to the sheet-metal bottom. This construction serves to provide a receptacle embodying a metallic or comparatively stiff bottom and sides of flexible material securely united together in a simple and inexpensive manner, the vertically extending seam acting as an angular guard around the lower edge of the bottom which prevents indentation or breakage.

The upper edge of the fabric of the sides and back are stitched around a rod or wire 16 which sustains the sides and back of the receptacle. The front ends of the wire 16 are extended downwardly to form legs or standards which are secured to the bottom 10 by looping their terminals around the overlapping edges of the bottom as at 17. A bar of wire 18 extends across the front of the receptacle and has its ends secured to wire 16. This cross wire 18 serves as a spacer for the upper front portion of the sides and extends through a handle 20, provided for convenience in handling the catcher. That portion of wire 16 to which the fabric of back 13 is connected is extended through the receptacle handle and is thereby firmly secured to the handle. The front portion of the sides 12 are flared outwardly, *i. e.*, the front edges thereof extend upwardly and outwardly from the receptacle to direct into the receptacle the grass blown laterally by the wind or discharged laterally by the knives. Cross wire or rod 18 extends straight across the front end of the receptacle and secures the front portion of the sides in spread relation, which is important because the sides direct much of the grass into the receptacle which would not otherwise be caught thereby. Receptacle handle 20 is of sufficient length to be sustained by a depending support or hanger 40 which is pivotally connected to the handle or push-bar 22 of the mower by a bolt 41. This support or hanger is provided with a plurality of holes 42 so it can be adjusted vertically to support the receptacle handle and the rear portion of the grass catcher in desired elevation. In the form shown in Figs. 2 and 8 support 40 is made of a flat bar and in the modified construction shown in Fig. 9 the support is formed of a strip of wire bent to form eyes 43 adapted to fit against the sides of the mower handle and through which the retaining bolt 41 can pass. Support or hanger 40 is provided with a plurality of seats 45, 46 and 47 in either of which the receptacle handle can be placed and whereby it can be sustained in desired position at either side of the mower handle or immediately beneath the same. It will thus be seen that the receptacle handle is removably and adjustably sustained by said support so the rear portion of the catcher can be held in desired relation laterally with respect to the mower.

By extending wire 16 through the handle at the back of the catcher and cross-wire or rod 18 across the extreme front of the receptacle, the catcher as a whole is rendered firm, strong and well braced. That portion of the handle between the wires 16 and 18 is convenient for use in carrying the laden receptacle either by grasping it with the hand or by hooking it over the arm of the operator while carrying it away from the mower to be emptied. The cross-rod 18 being located at and extending across the front of the receptacle provides a strong and firm connection between the handle and the front of the receptacle.

A detachable connection for the front of the receptacle comprises a bail 24 adapted to be secured to the mower and comprises sides or ends 26 having holes or elongated slots 27 therein through each of which passes one of the bolts 28 which are those usually provided for connecting the roller 29 to the mower-frame 30. Slots 27 of the bail make it possible to adjust the catcher connected thereto to or from the roller and adapt the bail for connection with mowers having rollers of different sizes. Bolts 28 are adapted to securely clamp the bail-sides 26 against the sides of the mower frame and to rigidly secure the bail thereto. The bail comprises a pair of angular members, one for each side of the mower-frame. Each member has an inwardly extending arm or strip 25 and the inner ends of said strips or portions are connected by a sheathing 31 in which said arms are longitudinally movable and thereby the bail is rendered adjustable in width and adapted for attachment to mowers of different widths. The front edge of sheet-metal bottom 10 is extended upwardly as at 32 to form a wall or ledge extending across the front of the receptacle and adapted to fit against and overlie bail 24, and then downwardly as at 33 to form a hook or detachable connection for the receptacle and bail which permits the receptacle to be detached from the mower by lifting the receptacle off the bail. The lower edge portion 33 is reverted as at 34 to reinforce it. An important advantage of this construction is that the front end of the metallic bottom can be adjusted to a nicety to prevent the bottom from dragging on the ground. Upwardly extending wall or ledge 32 serves as a guard for preventing the grass from falling out of the receptacle and also from being drawn out by the wooden roller of the mower, and thus materially increases the capacity of the receptacle.

As clearly shown in Fig. 3 of the drawing, the bail is materially wider than the hook portion 33 at the front of the receptacle and the front portion of the receptacle is materially wider than the knives and roller 29 of the mower, which are usually of substantially the same width. This construction and arrangement are important because they permit the catcher to be adjusted laterally at either side of the mower, to provide a catcher which will receive all of the grass discharged backwardly and laterally from the mower at either side; that is, if the mower knives are constructed to throw the severed grass laterally or the wind blows it to the right and rearwardly, the receptacle can be adjusted accordingly by placing the catcher so it will have a corresponding relation with the mower. In like manner the catcher can be placed toward the left of the mower if the grass is thrown to that side. When desired, the receptacle can be held centrally with respect to the mower by placing the receptacle handle in seat 46 of support 40. When the receptacle handle rests in either of the seats of the support 40 the catcher will be retained in assigned relation laterally with respect to the mower. The support 40 is free to swing about bolt 41 which connects it to the mower handle and when it is desired to detach the receptacle from the mower for the removal of accumulated grass it is only necessary to swing backwardly support 40 when the handle will be free and the catcher can be lifted by the handle to disconnect the hook at its front from the bail. The catcher can also be detached by lifting the front end of the catcher away from the bail and then sliding the handle forwardly out of support 40.

The invention possesses several important advantages. Manifestly the catcher is adapted to receive all of the grass cut by the mower and more particularly that which is thrown laterally by wind. Without change of construction it can be applied to a mower having its knives constructed to throw the grass laterally to either one side or the other and can be adjusted from one side of the mower to the other to catch grass thrown laterally by the wind without detachment or removal from the mower. In its entirety the attachment can be produced at low cost. The sides flared outwardly at their front portions materially aid in directing the grass into the receptacle. The adjustable connection between the mower and receptacle is adapted to be applied to mowers of different widths and sizes. The retaining wall at the front of the mower also increases the capacity of the catcher.

The invention is not to be understood as restricted to the precise details set forth since these can be modified by the skilled mechanic without departing from the spirit and scope of the invention.

Having thus described the invention, what I claim as new and desire to secure by Letters Patent, is:

1. A grass catcher for lawn mowers, embodying a connection for attaching it to the lawn mower adapted to permit a free lateral adjustment of said grass catcher with respect to the lawn mower.

2. A grass catcher for lawn mowers, embodying a connection for attaching it to the lawn mower adapted to permit the lateral adjustment of said grass catcher with respect to the lawn mower without disconnection of the parts.

3. In a grass catcher, the combination of a receptacle, a support adapted to be secured to a mower, a freely adjustable connection between said support and the front of the receptacle which permits the receptacle to be readily shifted laterally to either side of the mower, and supporting means for the rear of the receptacle.

4. In a grass catcher, the combination of a receptacle, a support adapted to be secured to a mower, a sliding connection between said support and the front of the receptacle which permits the receptacle to be readily shifted laterally to either side of a mower, and supporting means for the rear of the receptacle.

5. In a grass catcher, the combination of a receptacle, a support adapted to be connected to a mower, a handle for the receptacle, a sliding connection between the support and the front end of the receptacle which permits the receptacle to be shifted to either side of a mower by shift of the handle, and supporting means for the rear portion of the handle.

6. In a grass catcher, the combination of a receptacle, a support adapted to be connected to a mower, a sliding connection between the front end of the receptacle and said support which permits the receptacle to be readily shifted laterally to either side of the mower, a handle secured to the receptacle, and means adapted to be connected to the handle of the mower for holding the handle in different lateral positions.

7. In a grass catcher, the combination of a receptacle, a support adapted to be secured to a mower, a sliding connection between the front end of the receptacle and the support which permits the receptacle to be shifted laterally along said support to hold the receptacle at either side of the mower, and supporting means for the rear of the receptacle and whereby it will be sustained in either of its adjusted positions.

8. In a grass catcher, the combination of a receptacle, a support adapted to be secured to a mower and a sliding connection between the front of the receptacle and the support which permits the receptacle to be shifted bodily to either side of the mower, a handle secured to the receptacle, and a support for the receptacle handle adapted to be connected to the handle of the mower and which is adjustable so the receptacle handle can be placed therein.

9. In a grass catcher, the combination of a receptacle, a support adapted to be secured to a mower, means for detachably connecting the front of the receptacle to said support, said connecting means being laterally adjustable to hold the receptacle at either side of the mower, a handle for said receptacle, and a support adapted to be connected to the handle of the mower and having a plurality of seats therein for the handle.

10. The combination with a lawn mower, of a receptacle, and a free laterally adjustable connection between the front end of said receptacle and lawn mower whereby the receptacle may be shifted to project laterally to either side of the mower.

11. The combination with a lawn mower, of a receptacle, the front portion whereof is of greater width than the mower, and a detachable and sliding connection between the front end of the receptacle and the mower whereby the receptacle may be readily shifted laterally to project laterally from either side of the mower.

12. The combination with a lawn mower, of a receptacle, the front portion whereof is of greater width than the mower, a detachable and sliding connection between the front of the receptacle and the mower and which permits the receptacle to be readily shifted laterally to either side of the mower, a handle for the receptacle whereby the receptacle can be shifted laterally and detached, and means for connecting the rear end of the receptacle handle to the push-bar or handle of the mower.

13. The combination with a lawn mower, of a receptacle, the front portion whereof is of greater width than the mower, a detachable and sliding connection between the front end of the receptacle and the mower and which permits the receptacle to be readily shifted laterally to either side of the mower, a handle for the receptacle extending rearwardly therefrom, and a support connected to the handle or push-bar of the mower for holding the receptacle handle in different lateral positions.

14. In a grass catcher, the combination of a receptacle, a mower, a detachable and sliding connection between the front end of the receptacle and the mower which permits the receptacle to be readily shifted laterally with respect to the mower, a handle secured to the receptacle, and a laterally extending support for said handle adapted to be connected to the handle or push-bar of a mower and whereby the receptacle handle may be sustained in different lateral positions.

15. In a grass catcher, the combination of a receptacle comprising a bottom and sides, a bail, means for rigidly securing the bail to a mower to extend transversely thereof, a detachable connection between the front end of the receptacle and the bail, and means whereby the receptacle will be supported by the push-bar of the mower.

16. In a grass catcher, the combination of a receptacle comprising a bottom and sides, an extensible bail having connections adapted to be secured to a mower with the bail extending transversely of the mower, a detachable connection between the front of the receptacle and said bail, and means for supporting the rear of said receptacle from the push-bar of the mower.

17. In a grass catcher, the combination of a receptacle, comprising a bottom and sides, a bail adapted to be secured to the mower comprising two members one at each side of the mower, a sheathing for adjustably connecting said members, means at the front of the receptacle for detachably connecting the receptacle and said bail, and means whereby the rear of the receptacle will be supported by the push-bar of the mower.

18. In a grass catcher, the combination of a receptacle comprising a metallic bottom and fabric sides the edges of the metallic bottom and fabric sides being overlapped and interfolded to form a seam for uniting the sides and the bottom, said seam being flattened and extending upwardly at an angle to the bottom and around the lower edge thereof, and means whereby the receptacle can be detachably connected to a mower.

19. In a grass catcher, the combination of a receptacle comprising a bottom and sides, a support to be attached to a mower, a strip secured to and extending across the front of the receptacle and forming a hook for detachably connecting the receptacle to said support, and means whereby the receptacle can be supported by the push-bar of the mower.

20. In a grass catcher, the combination of a receptacle comprising a bottom and sides, a bail adapted to be secured to a mower and a strip extending across the front of the receptacle and secured thereto and bent to form a hook for engaging said bail and whereby the receptacle can be detachably connected to the bail.

21. In a grass catcher, the combination of a receptacle comprising sides and a metallic bottom, a bail adapted to be secured to a mower, said bottom being bent to form a wall extending across at its front, and to form a hook for engaging said support.

22. In a grass catcher, the combination of a receptacle comprising a metallic bottom and fabric sides, a wire at the upper edge of said sides, uprights secured to said bottom and at the front of the sides, a handle secured to the back of the receptacle, a rod extending across the front of the receptacle secured to the sides and extending through the front end of the handle, and means detachably connecting the receptacle to the mower.

23. In a grass catcher, the combination of a receptacle comprising a metallic bottom and fabric sides, a wire extending across the back of the receptacle and connected to the sides, a handle having a perforation therein through which said wire is extended to connect the rear of the receptacle to the handle, means for connecting the front of the receptacle to the front end of the handle, and means for detachably connecting the front end of the receptacle to a mower.

24. In a grass catcher, the combination of a receptacle comprising a metallic bottom and fabric sides, a wire extending across the back of the receptacle and connected to the sides, a handle having a perforation therein through which said wire is extended to connect the rear of the receptacle to the handle, a rod extending across the front of the receptacle secured to the sides, and means for detachably connecting the front end of the receptacle to a mower.

25. In a grass catcher, the combination of a receptacle comprising a metallic bottom and fabric sides, a handle for the receptacle, a wire at the upper edge of said sides and having a portion thereof extending across the back of the receptacle and through the handle and having uprights secured to the bottom at the front of the receptacle, a cross rod secured to said wire at the front of the receptacle and extending through the front of the handle, and means for detachably connecting the receptacle to a mower.

26. In a grass catcher, the combination of a receptacle, comprising a metallic bottom and fabric sides, a wire at the upper edge of said sides, uprights secured to said bottom at the front of the receptacle and extending upwardly and outwardly from the bottom, a cross rod at the front of the receptacle serving to hold the sides in spread relation, a handle secured to the cross rod and to the back of the receptacle, and means for detachably connecting the receptacle to the mower.

27. In a grass catcher, the combination of a receptacle comprising a metallic bottom and fabric sides, a wire at the upper edge of said sides, having legs secured to said bottom at the front of the receptacle, a cross wire at the front of the receptacle, and a handle secured to said cross wire and secured also to the back of the receptacle, said bottom being provided with a strip at the front edge for detachably connecting the receptacle to a mower.

JOSEPH H. COULT.

Witnesses:
DE FORREST WARD,
NINA E. ST. JOHN.